US012773663B2

(12) United States Patent
O'Brien

(10) Patent No.: US 12,773,663 B2
(45) Date of Patent: Oct. 27, 2026

(54) BIO LNG PRODUCTION USING MEMBRANES

(71) Applicant: Air Products and Chemicals, Inc., Allentown, PA (US)

(72) Inventor: Matthew P. O'Brien, House Springs, MO (US)

(73) Assignee: Air Products and Chemicals, Inc., Allentown, PA (US)

( * ) Notice: Subject to any disclaimer, the term of this patent is extended or adjusted under 35 U.S.C. 154(b) by 524 days.

(21) Appl. No.: 18/499,285

(22) Filed: Nov. 1, 2023

(65) Prior Publication Data

US 2025/0136884 A1 May 1, 2025

(51) Int. Cl.
*B01D 53/22* (2006.01)
*C10L 3/08* (2006.01)

(52) U.S. Cl.
CPC ......... *B01D 53/226* (2013.01); *B01D 53/227* (2013.01); *C10L 3/08* (2013.01); *B01D 2256/22* (2013.01); *B01D 2256/245* (2013.01); *B01D 2311/2512* (2022.08); *C10L 2290/04* (2013.01); *C10L 2290/548* (2013.01)

(58) Field of Classification Search
CPC ................ B01D 53/226; B01D 53/227; B01D 2311/2512; B01D 2256/22; B01D 2256/245; C10L 3/08; C10L 2290/04; C10L 2290/548
See application file for complete search history.

(56) References Cited

U.S. PATENT DOCUMENTS 8,999,038 B2 4/2015 Ungerank et al.
10,254,041 B2 4/2019 Van Roosmalen
11,285,434 B2 3/2022 Henry
11,731,076 B1 8/2023 O'Brien et al.
2010/0186586 A1* 7/2010 Chinn .................... B01D 53/22 96/10
2011/0223650 A1* 9/2011 Saunders ............... B01D 63/10 435/283.1
2015/0190747 A1* 7/2015 Ahn ................... B01D 19/0073 95/52
2017/0157555 A1* 6/2017 Karode ................ B01D 53/225
2017/0157556 A1* 6/2017 Karode .................. B01D 53/72
2017/0368497 A1* 12/2017 Priske .................. B01D 53/226
2018/0112142 A1* 4/2018 Foody ..................... C10L 3/105
2020/0254383 A1* 8/2020 Roodbeen ............ B01D 53/225
2020/0316516 A1* 10/2020 Wu ...................... B01D 53/226
2021/0339189 A1* 11/2021 Winkler ............... B01D 53/226
2022/0203293 A1* 6/2022 Myrick ................ B01D 53/226
2023/0016870 A1* 1/2023 Deng ................... B01D 53/228
2025/0229220 A1* 7/2025 O'Brien ............... B01D 53/227

FOREIGN PATENT DOCUMENTS

WO 2022193007 9/2022

* cited by examiner

*Primary Examiner* — Anthony Shumate

(74) *Attorney, Agent, or Firm* — Amy Carr-Trexler

(57) ABSTRACT

Disclosed herein are methods and systems for producing a liquefied methane product from a methane- and carbon dioxide-containing feed stream, in which a plurality of membrane stages comprising gas separation membranes that are more permeable to carbon dioxide than methane are used to remove carbon dioxide from the feed and form a retentate stream that is enriched in methane, said retentate stream being then cooled and liquefied to provide the liquefied methane product. In particular, the disclosed methods and systems may be used for producing liquefied biomethane from a biogas feed.

11 Claims, 6 Drawing Sheets

BIO LNG PRODUCTION USING MEMBRANES

BACKGROUND

The present invention relates to methods and systems for producing a liquefied methane product from a methane- and carbon dioxide-containing feed, in which a plurality of membrane stages comprising gas separation membranes that are more permeable to carbon dioxide than methane are used to remove carbon dioxide from the feed and form a retentate stream that is enriched in methane, said retentate stream being then cooled and liquefied to provide the liquefied methane product. In particular, the present methods and systems may be used for producing liquefied biomethane (also referred to as "LBM" or "bio LNG") from a biogas feed.

Using membranes for biogas upgrading is well known in the art. A variety of system configurations exist to achieve a range of target product compositions (i.e. methane purity) and product recovery. Two and three membrane stage systems are most common (see, for example, U.S. Pat. Nos. 8,999,038 and 11,285,434). Most of these systems aim to produce a methane product comprising 2 vol % or less of carbon dioxide, with a methane recovery of 95% or greater from a water-saturated feed stream comprising from 40 to 60 vol % methane and from 60 to 40 vol % carbon dioxide.

Liquefied natural gas (LNG) production via cryogenic processes is also well known in the art. However, the majority of LNG production takes pipeline quality gas or wellhead natural gas as a feedstock. Pre-treatments such as amine-based acid gas removal (i.e. carbon dioxide removal using the Selexol™ solvent and process) and drying using molecular sieve absorbers are required to remove water and carbon dioxide contents before they are introduced to the liquefier cold box. Carbon dioxide and water must be removed to prevent the formation of ice or hydrates in the cold box.

U.S. Pat. No. 10,254,041 discloses a system and method for processing a hydrocarbon-containing fluid, such as for example a biogas. A gaseous feed stream, having a methane concentration of at least 50 vol %, is upgraded using membranes to provide an upgraded stream having a methane content of at least 85 vol % and a carbon dioxide content of between 0.1 and 2 vol %. This upgraded stream is then liquified and flashed into a container, from which the following three streams are retrieved: (1) a liquid product stream having a methane concentration of at least 85 vol %; (2) a slurry flow of solid carbon dioxide and water ice; and (3) a flash gas stream. The flash gas can then be used as a sweep gas at a permeate side of one or more of the membranes.

BRIEF SUMMARY

Disclosed herein are methods and systems for producing a liquefied methane product from a methane- and carbon dioxide-containing feed, such as in particular for producing liquefied biomethane (also referred to as "LBM" or "bio LNG") from a biogas feed. The disclosed methods and systems use a plurality of membrane stages, comprising gas separation membranes that are more permeable to carbon dioxide than methane, to remove carbon dioxide from the feed and produce a methane-enriched retentate stream that is then liquefied to provide the liquefied methane product. The membrane stage from which said methane-enriched retentate stream is withdrawn comprises a plurality of gas separation modules of the hollow fiber type that are arranged in series, whereby retentate gas withdrawn from the fibers of a gas separation module is mixed before being passed to the fibers of the next module in the series, and whereby permeate gas withdrawn from the shell of a gas separation module is introduced as a sweep gas into the shell space of the preceding gas separation module in the series.

The disclosed methods and systems allow for the production of a methane-enriched retentate stream containing very low levels of carbon dioxide (e.g. 50 ppm (0.005 vol %) or less of $CO_2$) from a starting feed containing high amounts of carbon dioxide, using only membrane-based gas separation technology. This, in turn, means that the disclosed methods and systems can produce a liquefied biomethane (or other such) product from a raw biogas (or other such) feed using only membrane units and a liquefaction unit, without the need for any additional units or extraneous equipment for $CO_2$ removal such as an amine washing unit or a TSA (temperature swing adsorption) unit for removing $CO_2$ upstream of the liquefaction unit or specialized equipment for removing frozen $CO_2$ solids from within or downstream of the liquefaction unit.

Via the specific arrangement of gas separation modules of the membrane stage from which the methane-enriched retentate stream is withdrawn, the disclosed methods and systems also enable the production of said methane-enriched retentate stream containing very low levels of $CO_2$, using only membrane-based gas separation technology, whilst still keeping to a reasonable membrane count (i.e. using a reasonable total surface area of membrane) and with high methane recovery (i.e. minimal methane losses).

Where the feed is biogas or another type of gas that contains or is likely to contain, in addition to $CO_2$, water and/or one or more other acid gases (e.g. $H_2S$) that can freeze in the liquefaction unit, the disclosed methods and systems can also remove these components from the feed by using in the membrane stages gas separation membranes that are also more permeable to these components than methane. In this way, a methane-enriched retentate stream containing also very low (e.g. 1 ppm or less of water and 5 mg/Nm$^3$ or less of $H_2S$) levels of these components can be generated, thereby again allowing this stream to liquified without any danger of creating solids and eliminating the need for additional units or extraneous equipment for removing these components prior to, during, or after liquefaction.

Several exemplary aspects of the systems and methods according to the present invention are outlined below.

Aspect 1: A method of producing a liquefied methane product from a methane- and carbon dioxide-containing feed, the method comprising:

(a) introducing a feed stream, comprising methane and carbon-dioxide, into a first membrane stage comprising a first gas separation membrane that is more permeable to carbon dioxide than methane;

(b) separating the feed stream in the first membrane stage into a first retentate stream that is enriched in methane and a first permeate stream that is enriched in carbon dioxide;

(c) introducing the first retentate stream into a second membrane stage comprising a second gas separation membrane that is more permeable to carbon dioxide than methane;

(d) separating the first retentate stream in the second membrane stage into a second retentate stream that is further enriched in methane and a second permeate stream; and (e) cooling the second retentate stream to form a liquefied methane product stream from at least a portion of said second retentate stream;

wherein the second membrane stage comprises a plurality of gas separation modules arranged in series, each of said gas separation modules comprising a shell, a bundle of hollow fibers contained within said shell, and a shell space exterior to the hollow fibers and interior to the shell, each of the hollow fibers comprising a bore with open ends and a side wall formed of a membrane material that is more permeable to carbon dioxide than methane, said hollow fibers together constituting all or part of the second gas separation membrane; and wherein said plurality of gas separation modules are configured such that retentate gases and permeate gases flow through the gas separation modules in countercurrent directions, retentate gases exiting from the open ends of the hollow fibers of a gas separation module being mixed before being introduced into the open ends of the hollow fibers of a next gas separation module in the series with the retentate gases exiting the open ends of the hollow fibers of a last gas separation module in the series forming the second retentate stream, and permeate gases exiting the shell space of a gas separation module being introduced as a sweep gas into the shell space of a preceding gas separation module in the series with the permeate gases exiting the shell space of a first gas separation module in the series forming the second permeate stream.

Aspect 2: The method of Aspect 1, wherein the plurality of gas separation modules comprise at least three gas separation modules arranged in series.

Aspect 3: The method of Aspect 1 or 2, wherein the feed stream is a biogas feed stream and the liquefied methane product stream is a liquefied biomethane product stream.

Aspect 4: The method of any one of Aspects 1 to 3, wherein the second retentate stream comprises 0.005 vol % or less of carbon dioxide.

Aspect 5: The method of any one of Aspects 1 to 4, wherein the second retentate stream has a volumetric concentration of carbon dioxide that is reduced by a factor of at least 2000, more preferably at least 3000, and most preferably at least 5000, relative to the volumetric concentration of carbon dioxide in the first retentate stream.

Aspect 6: The method of any one of Aspects 1 to 5, wherein step (e) comprises cooling the second retentate stream to form an at least partially liquefied second retentate stream and flashing and separating said at least partially liquefied second retentate stream to form a flash gas and the liquefied methane product stream.

Aspect 7: The method of Aspect 6, wherein the method further comprises using a stream of the flash gas as a sweep gas in the second membrane stage, said stream of flash gas being introduced as a sweep gas into the shell space of the last gas separation module in the series.

Aspect 8: The method of any one of Aspects 1 to 7, wherein the method further comprises:

(f) recycling the second permeate stream into the feed stream.

Aspect 9: The method of any one of Aspects 1 to 8, wherein the method further comprises:

(g) introducing the first permeate stream into a third membrane stage comprising a third gas separation membrane that is more permeable to carbon dioxide than methane; and (h) separating the first permeate stream in the third membrane stage into a third permeate stream that is further enriched in carbon dioxide and a third retentate stream.

Aspect 10: The method of Aspect 9, wherein the method further comprises:

(i) recycling the third retentate stream into the feed stream.

Aspect 11: The method of any one of Aspects 1 to 10, wherein the method further comprises compressing the feed stream prior to the introduction of the feed stream into the first membrane stage in step (a).

Aspect 12: A system for producing a liquefied methane product from a methane- and carbon dioxide-containing feed, the system comprising:

a first membrane stage comprising a first gas separation membrane that is more permeable to carbon dioxide than methane, the first membrane stage being configured to receive a feed stream comprising methane and carbon dioxide and separate said feed stream into a first retentate stream that is enriched in methane and a first permeate stream that is enriched in carbon dioxide;

a second membrane stage comprising a second gas separation membrane that is more permeable to carbon dioxide than methane, the second membrane stage being configured to receive the first retentate stream and separate said stream into a second retentate stream that is further enriched in methane and a second permeate stream; and a heat exchanger for cooling the second retentate stream to form a liquefied methane product stream or an at least partially liquefied second retentate stream from which a liquefied methane product stream can be produced;

wherein the second membrane stage comprises a plurality of gas separation modules arranged in series, each of said gas separation modules comprising a shell, a bundle of hollow fibers contained within said shell, and a shell space exterior to the hollow fibers and interior to the shell, each of the hollow fibers comprising a bore with open ends and a side wall formed of a membrane material that is more permeable to carbon dioxide than methane, said hollow fibers together constituting all or part of the second gas separation membrane; and wherein said plurality of gas separation modules are configured such that retentate gases and permeate gases flow through the gas separation modules in countercurrent directions, retentate gases exiting from the open ends of the hollow fibers of a gas separation module being mixed before being introduced into the open ends of the hollow fibers of a next gas separation module in the series with the retentate gases exiting the open ends of the hollow fibers of a last gas separation module in the series forming the second retentate stream, and permeate gases exiting the shell space of a gas separation module being introduced as a sweep gas into the shell space of a preceding gas separation module in the series with the permeate gases exiting the shell space of a first gas separation module in the series forming the second permeate stream.

Aspect 13: The system of Aspect 12, wherein the plurality of gas separation modules comprise at least three gas separation modules arranged in series.

Aspect 14: The system of Aspect 12 or 13, wherein the second membrane stage has a surface area of the second gas separation membrane that is configured to provide a second retentate stream comprising 0.005 vol % or less of carbon dioxide.

Aspect 15: The system of any one of Aspects 12 to 14, wherein the second membrane stage has a surface area of the second gas separation membrane that is configured to provide a second retentate stream having a volumetric concentration of carbon dioxide that is reduced by a factor of at least 2000, more preferably at least 3000, more preferably at least 5000 relative to the volumetric concentration of carbon dioxide in the first retentate stream.

Aspect 16: The system of any one of Aspects 12 to 15, wherein the heat exchanger cools the second retentate stream to form an at least partially liquefied second retentate stream, and wherein the system further comprises a flash drum in fluid flow communication with the heat exchanger for receiving, flashing and separating the at least partially liquefied second retentate stream to form a flash gas and the liquefied methane product stream.

Aspect 17: The system of Aspect 16, wherein the flash drum is in fluid flow communication with the second membrane stage, the second membrane stage being configured to receive a stream of the flash gas as a sweep gas whereby said stream of flash gas is introduced as a sweep gas into the shell space of the last gas separation module in the series.

Aspect 18: The system of any one of Aspects 12 to 17, wherein the system is further configured such that the second permeate stream is recycled into the feed stream.

Aspect 19: The system of any one of Aspects 12 to 18, wherein the system further comprises:

a third membrane stage comprising a third gas separation membrane that is more permeable to carbon dioxide than methane, the third membrane stage being configured to receive the first permeate stream and separate said stream into a third permeate stream that is further enriched in carbon dioxide and a third retentate stream.

Aspect 20: The system of Aspect 19, wherein the system is further configured such that the third retentate stream is recycled into the feed stream.

Aspect 21: The system of any one of Aspects 12 to 20, wherein the system further comprises a compressor for compressing the feed stream prior to introduction of the feed stream into the first membrane stage.

DETAILED DESCRIPTION

Figure 1:
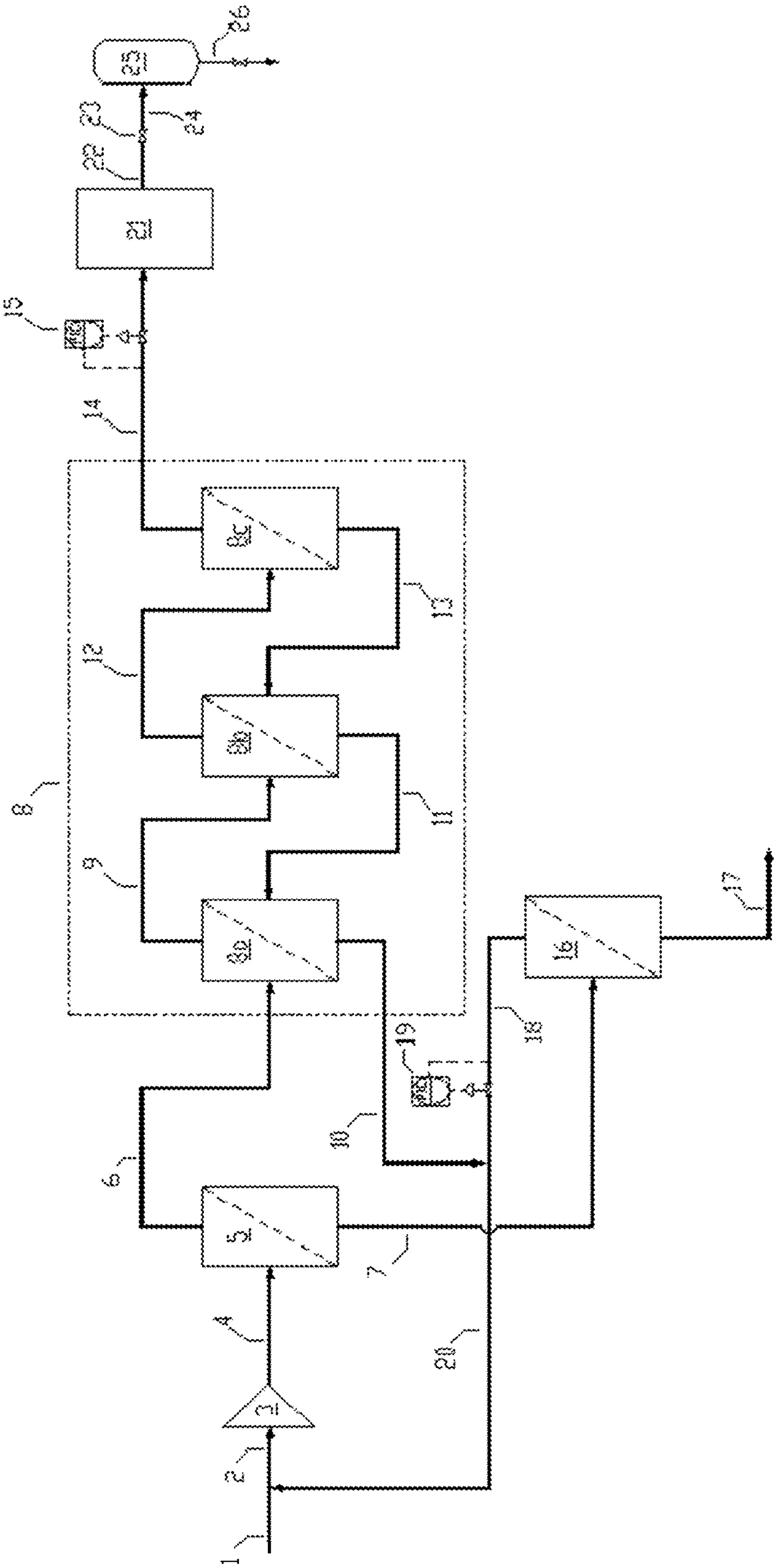
FIG. 1 is a schematic depicting a method and system for producing a liquefied methane product from a methane and carbon-dioxide containing-feed in accordance with a first embodiment of the present invention.

As used herein and unless otherwise indicated, the articles “a” and “an” mean one or more when applied to any feature in embodiments of the present invention described in the specification and claims. The use of “a” and “an” does not limit the meaning to a single feature unless such a limit is specifically stated. The article “the” preceding singular or plural nouns or noun phrases denotes a particular specified feature or particular specified features and may have a singular or plural connotation depending upon the context in which it is used.

Where letters are used herein to identify recited steps of a method (e.g. (a), (b), and (c)), these letters are used solely to aid in referring to the method steps and are not intended to indicate a specific order in which claimed steps are performed, unless and only to the extent that such order is specifically recited.

Where used herein to identify recited features of a method or system, the terms “first”, “second”, “third” and so on, are used solely to aid in referring to and distinguishing between the features in question, and are not intended to indicate any specific order of the features, unless and only to the extent that such order is specifically recited.

As used herein, reference to a stream from a gas separation step or process being “enriched” in a particular gas or component means that the stream has a higher vol % of said particular gas or component than the stream from which it was separated. Thus, for example, where a feed stream containing methane and carbon dioxide is separated in a first membrane stage into first retentate stream that is enriched in methane and a first permeate stream that is enriched in carbon dioxide, the first retentate stream has a higher vol % of methane than the feed stream and the first permeate stream has a higher vol % of carbon dioxide than the feed stream. Likewise, where said first retentate stream is then separated in a second membrane stage to provide a second retentate stream that is further enriched in methane, said second retentate stream has a vol % of methane that is higher than that of the first retentate stream and that is thus further elevated compared to that of the feed stream.

As used herein, the term “fluid flow communication” refers to a connectivity between two or more components that enables liquids, vapors, and/or two-phase mixtures to be transported between the components in a controlled fashion (i.e., without leakage) either directly or indirectly. Coupling two or more components such that they are in fluid flow communication with each other can involve any suitable method known in the art, such as with the use of welds, flanged conduits, gaskets, and bolts. Two or more components may also be coupled together via other components of the system that may separate them, for example, valves, gates, or other devices that may selectively restrict or direct fluid flow. As used herein, the term “conduit” refers to one or more structures through which fluids can be transported between two or more components of a system. For example, conduits can include pipes, ducts, passageways, and combinations thereof that transport liquids, vapors, and/or gases.

As used herein, the term "gas separation membrane" refers to a (usually thin) barrier that is more permeable to one or more components (i.e. compounds, molecules or atoms) of a gaseous mixture than one or more other components of the gaseous mixture, and that therefore forms a selective barrier for separating said gaseous mixture into a retentate gas enriched in the less permeable component(s) and a permeate gas enriched in the more permeable component(s)—the more permeable component(s) being the component(s) that permeate the membrane more quickly, and the less permeable component(s) being the component(s) that permeate the membrane more slowly. The membrane may be formed of one or more materials of any suitable kind, although often one or more polymeric materials are used, and may take the form of one or more asymmetric or composite hollow fibers, flat sheets, spiral wound sheets, or have any other suitable configuration.

As used herein, the term "gas separation module" refers to a unit suitable for separating a gas mixture into a retentate gas and a permeate gas, said unit comprising a shell and a gas separation membrane contained within said shell that divides the shell interior into a feed side and a permeate side. The gas mixture is introduced into the shell on the feed side via a feed inlet to the shell. Gas that permeates the gas separation membrane forms the permeate gas (which is enriched in the more permeable component(s) of the gas mixture) that is then withdrawn from the permeate side via a permeate gas outlet to the shell. Conversely, gas that does not permeate the gas separation membrane forms the retentate gas (which is enriched in the less permeable component(s) of the gas mixture) that is withdrawn from the retentate side via a retentate gas outlet to the shell. As noted above, the gas separation membrane may be formed of any suitable material(s), and unless otherwise indicated may take any suitable form such as, but not limited to, one or more hollow fibers, flat sheets or spiral wound sheets.

In the case where the gas separation membrane of the gas separation module takes the form of a bundle of hollow fibers, with each of the hollow fibers comprising a bore with open ends and a side wall formed of the membrane material(s), the fibers are typically arranged such that the interiors of the hollow fibers (i.e. the bores of the fibers) form the feed side of the module and a shell space exterior to the hollow fibers and interior to the shell forms the permeate side of the module. Thus, in this arrangement, the gas mixture is introduced into the shell via the feed inlet and enters the fiber bores via one end of the fibers. The gases permeating the side walls of the fibers form the permeate gases that are then withdrawn from the shell space via the permeate gas outlet to the shell; and the gases passing through the fiber bores and exiting the other end of the fibers form the retentate gases that are then withdrawn via the retentate gas outlet to the shell.

As used herein, the term "membrane stage" refers to a device, comprising a gas separation membrane, that is suitable for separating a gas mixture stream into a retentate stream enriched in the less permeable component(s) of the gas mixture stream and a permeate stream enriched in the more permeable component(s) of the gas mixture stream. A membrane stage is comprised of one or more gas separation modules, the gas separation membrane(s) of said gas separation module(s) constituting the gas separation membrane of the membrane stage, the retentate stream being formed from the retentate gases withdrawn from said gas separation module(s) and the permeate stream being formed from the permeate gases withdrawn from said gas separation module(s). Where a membrane stage is comprised of a plurality of (i.e. two or more) gas separation modules, said gas separation modules may (unless otherwise indicated) be arranged in series or in parallel. Where two gas separation modules are arranged in series, a gas mixture is fed to the first gas separation module in the series, and the retentate gas withdrawn from the first gas separation module in the series forms the gas mixture introduced into the second gas separation module in the series. Where two gas separation modules are arranged in parallel, a gas mixture is divided into two portions with one portion being introduced into one of the gas separation modules and the other portion being introduced into the other of the gas separation modules, and with the retentate gases from the two gas separation modules being combined (unless there are also one or more further gas separation modules arranged in series with one or both of the gas separation modules arranged in parallel).

In order to generate driving force for permeating gas across the gas separation membrane of a membrane stage or gas separation module, a pressure differential is generated between the feed and permeate sides of the membrane stage or gas separation module. Said pressure differential may be generated by providing a vacuum on the permeate side of the membrane stage or gas separation module and/or by elevating the pressure on the feed side of the membrane stage or gas separation module, using one or more vacuum pumps and/or compressors.

As used herein, the term "sweep gas" refers to a stream of gas that is supplied to the permeate side of a membrane stage or gas separation module in order to reduce the concentration on the permeate side of the more permeable component(s) of the gas mixture fed to said membrane stage or gas separation module, thereby reducing the partial pressure of said components on the permeate side of said membrane stage or gas separation module. This further helps drive the permeation of said components across the gas separation membrane of said membrane stage or gas separation module.

As used herein, the term "first gas separation module in the series", when used in relation to a membrane stage comprising a plurality of gas separation modules arranged in series, means the initial gas separation module that receives the initial gas mixture stream that is to be separated by said series of gas separation modules and that is therefore most upstream with respect to the retentate stream produced by said series of gas separation modules. Likewise, the term "last gas separation module in the series", when used in relation to a membrane stage comprising a plurality of gas separation modules arranged in series, means the final gas separation module from which the retentate gases are withdrawn that form the retentate stream produced by said series of gas separation modules, said gas separation module being therefore the most downstream with respect to said retentate stream.

As used herein, the term "biogas feed stream" refers to a stream of gas comprising predominantly methane ($CH_4$) and carbon dioxide ($CO_2$) that is produced by the breakdown of organic matter. It may for example be produced from raw materials such as agricultural waste, manure, municipal waste, plant material, sewage, green waste, wastewater, and/or food waste, and may for example be produced by anaerobic digestion with anaerobic organisms or methanogens inside an anaerobic digester, biodigester or a bioreactor. Particular examples include biogas generated from anaerobic digester lagoons or from landfill sites. Although composed predominantly of methane and carbon dioxide, it may also contain small amounts of other components, such as for example hydrogen sulfide ($H_2S$), moisture ($H_2O$), nitrogen ($N_2$) and/or oxygen ($O_2$). Typically, a biogas feed stream will comprise at least 40 vol %, or at least 50 vol %, or between 50 and 80 vol %, or between 55 and 70 vol % methane. Typically, a biogas feed stream will comprise at least 15 vol %, or between 15 and 60 vol %, or between 15 and 50 vol %, or between 30 and 45 vol % carbon dioxide.

As used herein, the term "biomethane" refers to a methane stream produced by removing carbon dioxide from biogas to increase the concentration of methane so as to be comparable to the concentration present in natural gas, thereby meeting the product specifications for distribution via gas pipeline networks. Typically, a biomethane product stream will comprise at least 95 vol %, or at least 97 vol %, or at least 98 vol %, or at least 99 vol % methane.

Solely by way of example, various exemplary embodiments of the invention will now be described with reference to the Figures. In the Figures, where a feature is common to more than one Figure that feature has been assigned the same reference numeral. Unless a feature is specifically described as being different from other embodiments in which it is shown in the drawings, that feature can be assumed to have the same structure and function as the corresponding feature in the embodiment in which it is described. Moreover, if that feature does not have a different structure or function in a subsequently described embodiment, it may not be specifically referred to in the specification.

Referring now to FIG. 1, a method and system for producing a liquefied methane product from a methane- and carbon dioxide-containing feed stream is shown. The feed stream may for example be a raw biogas stream produced from mostly anaerobic fermentation of a biomass material such as agricultural waste, manure, municipal waste, plant material, sewage, green waste and/or food waste, although any feed stream that primarily comprises methane ($CH_4$) and carbon dioxide ($CO_2$) may be used. In addition to methane and carbon dioxide, trace amounts of water vapor ($H_2O$), hydrogen sulfide ($H_2S$), nitrogen ($N_2$), and oxygen ($O_2$) may also be present in the feed stream.

The methane- and carbon dioxide-containing feed stream (1), which is for example at atmospheric pressure, is compressed in a compressor (3) to form a compressed feed stream (4). The compressor (3) may comprise a single compression stage, or a plurality of compression stages arranged in series and/or parallel, and may include one or more intercoolers and/or aftercoolers (not shown). The compressed feed stream (4) is then introduced into a first membrane stage (5) comprising a first gas separation membrane that is more permeable to carbon dioxide than methane, in which the feed stream is separated into a first retentate stream (6) that is enriched in methane and a first permeate stream (7) that is enriched in carbon dioxide. The pressure of the first permeate stream (7) is lower than the pressure of the compressed feed stream, but is still elevated compared to the initial (e.g. atmospheric) pressure of the methane- and carbon dioxide-containing feed stream (1).

The first membrane stage (5) may comprise a single gas separation module (as depicted in FIG. 1), or a plurality of gas separation modules. Where the first membrane stage (5) comprises a plurality of gas separation modules, these may be arranged in series and/or in parallel. The gas separation membrane present in said gas separation module(s) may take the form of one or more hollow fibers, flat sheets, spiral wound sheets, or have any other suitable configuration.

The first retentate stream (6) withdrawn from the first membrane stage (5) is then introduced into a second membrane stage (8) comprising a second gas separation membrane that is more permeable to carbon dioxide than methane. As will be described in further detail below, the first retentate stream (6) is separated in the second membrane stage (8) into a second retentate stream (14) that is further enriched in methane and a second permeate stream (10). The pressure of the second permeate stream (10) is lower than the pressure of the first retentate stream (6). The pressure of the second permeate stream (10) may, for example be the same as the initial (e.g. atmospheric) pressure of the methane- and carbon dioxide-containing feed stream (1).

The second membrane stage (8) comprises a plurality of gas separation modules (8*a*, 8*b*, 8*c*) arranged in series. As will be described in further detail below with reference to FIG. 3, each of said gas separation modules is a module of the hollow fiber type, comprising a shell, a bundle of hollow fibers contained within said shell, and a shell space exterior to the hollow fibers and interior to the shell. Each of the hollow fibers comprises a bore with open ends and a side wall formed of a membrane material that is more permeable to carbon dioxide than methane. Said hollow fibers together constitute all or part of the second gas separation membrane, i.e. the gas separation membrane of the second membrane stage (8).

In the embodiment depicted in FIG. 1, said plurality of gas separation modules arranged in series consists of three gas separation modules (8*a*, 8*b*, 8*c*) arranged in series, however in alternative embodiments said plurality of gas separation modules arranged in series could consist of just two gas separation modules arranged in series, or four or more gas separation modules arranged in series. Although not depicted in the embodiment depicted in FIG. 1, the second membrane stage (8) could also comprise one or more additional gas separation modules arranged in parallel with said plurality of gas separation modules arranged in series (with said additional gas separation modules preferably also being modules of the hollow fiber type). For example, the second membrane stage (8) could comprise a first set of gas separation modules consisting of said plurality of gas separation modules (8*a*, 8*b*, 8*c*) arranged in series, and one or more additional sets of gas separation modules each also consisting of a plurality of gas separation modules arranged in series, with each of said additional sets of gas separation modules being arranged in parallel with the first set of gas separation modules. In one such arrangement, the first retentate stream (6) would be divided between the sets of gas separation modules with each set receiving a portion of the first retentate stream, said portion being introduced into the first gas separation module in the series, with each set producing a portion of the second retentate stream (14) said portion being withdrawn from the last gas separation module in the series, and with each set producing a portion of the second permeate stream (10), said portion being withdrawn from the first gas separation module in the series. In such an arrangement there may, if desired, also be mixing of gases between the sets of gas separation modules at other points in the series. For example, in the scenario where there are two sets of gas separation modules each consisting of two gas separation modules arranged in series, the retentate gases withdrawn from the first gas separation module in the series in the first set could be mixed with the retentate gases withdrawn from the first gas separation module in the series in the second set, with said mixed retentate gases then being divided and introduced into the second gas separation modules in series of each of the sets; and, likewise, the permeate gases withdrawn from the second gas separation module in the series in the first set could be mixed with the permeate gases withdrawn from the second gas separation module in the series in the second set, with said mixed permeate gases then being divided and introduced into the first gas separation modules in series of each of the sets.

Returning to the embodiment as depicted in FIG. 1, the first retentate stream (6) is introduced into the first gas separation module (8*a*) in the series of gas separation modules (8*a*, 8*b*, 8*c*), and enters the fiber bores of the first gas separation module (8*a*) via the open ends of the fibers at one end of the fiber bundle. A first sweep gas stream (11) is introduced into the shell space of the first gas separation module (8*a*) exterior to the hollow fibers, flowing in a countercurrent direction to the first retentate stream (6). Gases from the first retentate stream that permeate the side walls of the fibers into the shell space form permeate gases that mix with the sweep gas and are withdrawn from the first gas separation module (8*a*) forming the second permeate stream (10). Gases from the first retentate stream that pass through the fiber bores and exit the open ends of the fibers at the other end of the fiber bundle form retentate gases that mix and are withdrawn from the first gas separation module (8*a*) as a first intermediate retentate stream (9).

The first intermediate retentate stream (9) is introduced into the second gas separation module (8*b*) in the series of gas separation modules (8*a*, 8*b*, 8*c*), and enters the fiber bores of the second gas separation module (8*b*) via the open ends of the fibers at one end of the fiber bundle. A second sweep gas stream (13) is introduced into the shell space of the second gas separation module (8*b*) exterior to the hollow fibers, flowing in a countercurrent direction to the first intermediate retentate stream (9). Gases from the first intermediate retentate stream that permeate the side walls of the fibers into the shell space form permeate gases that mix with the sweep gas and are withdrawn from the second gas separation module (8*b*) forming the first sweep gas stream (11) that is introduced into the first gas separation module (8*a*). Gases from the first intermediate retentate stream that pass through the fiber bores and exit the open ends of the fibers at the other end of the fiber bundle form retentate gases that mix and are withdrawn from the second gas separation module (8*b*) as a second intermediate retentate stream (12).

The second intermediate retentate stream (12) is introduced into the third and final gas separation module (8*c*) in the series of gas separation modules (8*a*, 8*b*, 8*c*), and enters the fiber bores of the third gas separation module (8*c*) via the open ends of the fibers at one end of the fiber bundle. Gases from the second intermediate retentate stream that permeate the side walls of the fibers into the shell space form permeate gases that flow through the shell space in a countercurrent direction to the second intermediate retentate stream (12) and are withdrawn from the third gas separation module (8*c*) forming the second sweep gas stream (13) that is introduced into the second gas separation module (8*b*). Gases from the second intermediate retentate stream that pass through the fiber bores and exit the open ends of the fibers at the other end of the fiber bundle form retentate gases that mix and are withdrawn from the third gas separation module (8*c*) forming the second retentate stream (14).

Each of the gas separation modules in the series of gas separation modules (8*a*, 8*b*, 8*c*) progressively further lowers the amount of $CO_2$ that is present in the retentate gases withdrawn from that module, such that the retentate gases withdrawn from the third gas separation module (8*c*) that form the second retentate stream (14) have an extremely low $CO_2$ content, such as a CO2 content of 50 ppm (0.005 vol %) or less. Typically, this requires that the volumetric concentration of carbon dioxide the second retentate stream (14) is reduced by a factor of at least 5000 relative to the volumetric concentration of carbon dioxide in the first retentate stream (6), which is achieved by the arranging and operating the series of gas separation modules (8*a*, 8*b*, 8*c*) in the manner described above (as well as by ensuring that the total surface area of the membranes in said modules, and thus the total surface area of the second gas separation membrane as a whole, is sufficient to achieve this).

The first permeate stream (7) is introduced into a third membrane stage (16) comprising a third gas separation membrane that is more permeable to carbon dioxide than methane, in which the first permeate stream is separated into a third permeate stream (17) that is further enriched in carbon dioxide and a third retentate stream (18). The pressure of the third permeate stream (17) is lower than the pressure of the first permeate stream (7), and may for example be at atmospheric pressure, or below atmospheric pressure if the system were to employ a vacuum pump (not shown) in order to reduce the pressure of the third permeate stream (17) to below atmospheric pressure. The third permeate stream (17) is preferably a $CO_2$ stream of high purity (e.g. 95 vol % or higher, or 98% or higher), which may be used as a $CO_2$ product stream or sent for carbon sequestration.

The third membrane stage (16) may comprise a single gas separation module (as depicted in FIG. 1), or a plurality of gas separation modules. Where the third membrane stage (16) comprises a plurality of gas separation modules, these may be arranged in series and/or in parallel. The gas separation membrane present in said gas separation module(s) may take the form of one or more hollow fibers, flat sheets, spiral wound sheets, or have any other suitable configuration.

Where the feed stream (1) contains, in addition to methane ($CH_4$) and carbon dioxide ($CO_2$), also trace amounts of water vapor ($H_2O$), hydrogen sulfide ($H_2S$) and/or one or more other acid gases, the first, second and third gas separation membranes are preferably also more permeable said additional components of the feed stream (i.e. $H_2O$, $H_2S$ and/or other acid gases) than methane, such that the second retentate stream (14) that is produced not only has an extremely low $CO_2$ content but also has an extremely low content of water, $H_2S$ and other acid gases.

Suitable materials for forming the first, second, and third gas separation membranes are well known in the art. For example, various types of glassy polymeric materials are known that are suitable for forming gas separation membranes, that are significantly more permeable to $CO_2$, $H_2O$, $H_2S$ and $O_2$, than $CH_4$ (or $N_2$).

The second permeate stream (10) and the third retentate stream (18) are recycled into the feed stream (1) in order maximize methane recovery (minimize methane losses). In the arrangement depicted in FIG. 1, the third retentate stream (18) passes through and is let-down in pressure in a pressure control valve (19) that is used to control the pressure of the feed side of the third membrane stage (16) and hence, also, the first permeate stream; after which the third retentate stream (18) may be at the same pressure as both the second permeate stream (10) and the initial pressure of the feed stream (1), with the third retentate stream (18) and the second permeate stream (10) being then mixed (20) and introduced into the feed stream (1), prior to the compression of said feed stream (2) in the compressor (3) as described above. However, it should be noted that in alternative arrangements (not shown) the third retentate stream (18) and the second permeate stream (10) could be introduced separately into the feed stream, and either or both of said stream could be compressed in separate compressors prior and/or combined with the feed stream (1) during or after compression of the feed stream in compressor (3). For example, in one alternative arrangement where compressor (3) is a multi-stage compressor comprising a plurality of stages arranged in series, the second permeate stream (10) could be combined with the feed stream (1) prior to compression of the feed stream in the multi-stage compressor, while the third retentate stream (18) could be let down in pressure in pressure control valve (19) to a pressure that is still higher than the initial pressure of the feed stream (1) and then combined with the partially compressed feed stream between stages of the multi-stage compressor.

The second retentate stream (14) is fed to a liquefaction unit (21) comprising a main cryogenic heat exchanger (MCHE) in which the second retentate stream is cooled and liquefied to form a liquefied second retentate stream (22). The refrigeration for the liquefaction unit (21) and MCHE may be provided by any suitable refrigerant and refrigeration cycle known in the art, such as for example a Reverse-Brayton gas expander cycle using nitrogen or methane as the refrigerant, or a mixed refrigerant cycle. The liquefied second retentate stream (22) is then reduced in pressure across J-T valve (23) forming a reduced pressure stream (24) that is introduced into a drum (25) from which the liquefied methane (e.g. liquefied biomethane) end-product stream (26) is withdrawn. Any flash gas generated by the reduction in pressure of the second retentate stream (22) across J-T valve (23) and separated from the liquefied methane end-product in drum (25) may be used as a fuel stream (for example for powering compressor (3)) and/or or put to any other suitable use.

A notable advantage of the method and system depicted in FIG. 1 is that, due to the extremely low $CO_2$ (and also extremely low content of water, $H_2S$ and other acid gases) of the second retentate stream (14), no additional units or extraneous equipment for $CO_2$ removal—such as an amine washing unit or a TSA (temperature swing adsorption) unit for removing $CO_2$ upstream of the liquefaction unit (21) or specialized equipment for removing frozen $CO_2$ solids from within or downstream of the liquefaction unit (21)—are required A further benefit of the method and system depicted in FIG. 1 is that because the sweep gas used in the earlier gas separation modules (8*a*, 8*b*) in the series of gas separation modules (8*a*, 8*b*, 8*c*) of the second membrane stage (8) is generated and provided by the later gas separation modules (8*b*, 8*c*) in the series of gas separation modules (8*a*, 8*b*, 8*c*) of the second membrane stage (8), no additional sweep gases are required to be generated and supplied to the second membrane stage (8).

Figure 2:
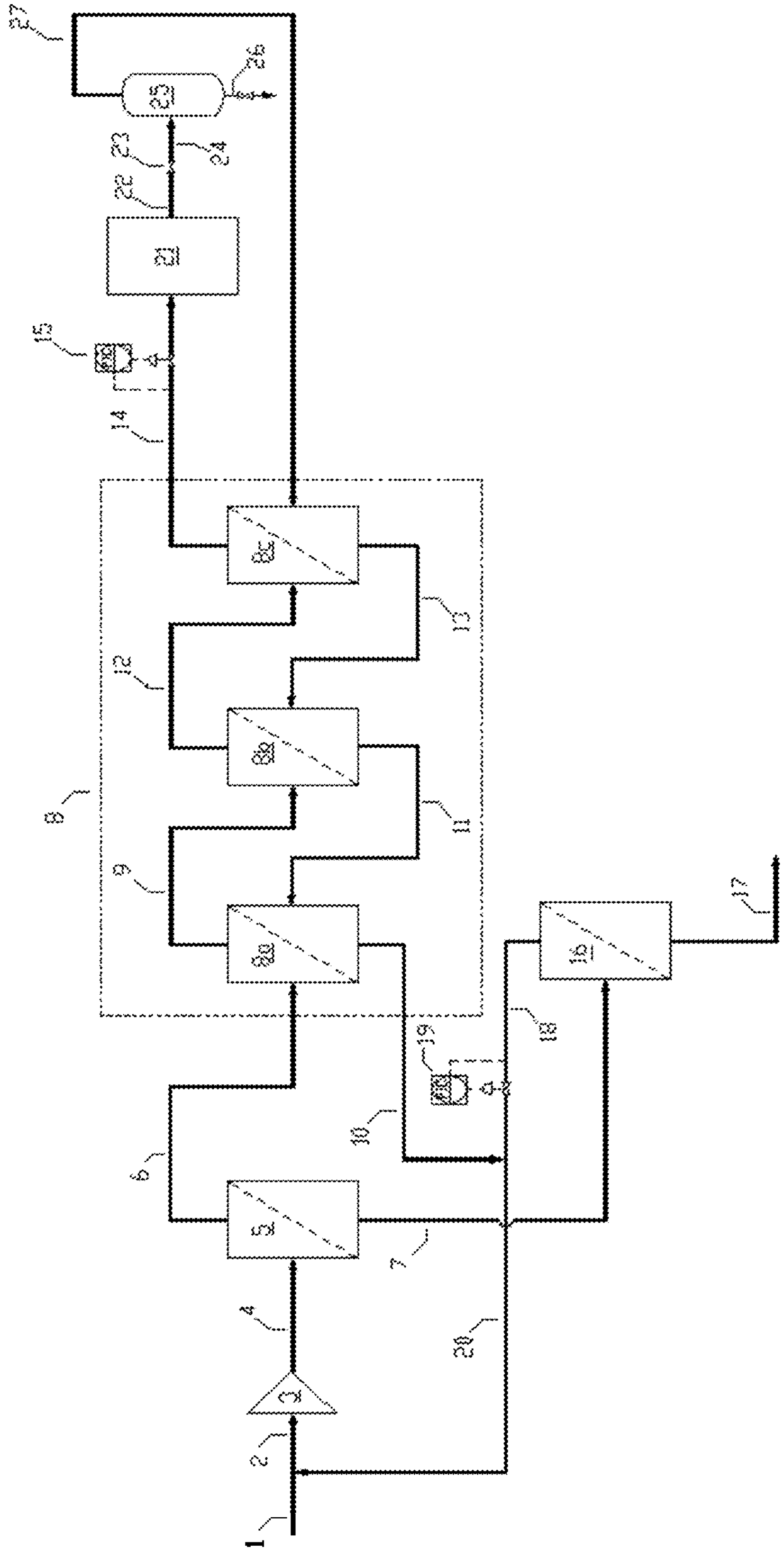
FIG. 2 is a schematic depicting a method and system for producing a liquefied methane product from a methane and carbon-dioxide containing-feed in accordance with a second embodiment of the present invention.

That said, in an alternative embodiment the method and system of FIG. 1 may be adapted as shown in FIG. 2 to also use flash gas separated from the liquefied methane end-product as an additional sweep gas in the second membrane stage (8).

More specifically, in the method and system depicted in FIG. 2, the liquefied second retentate stream (22) exiting the liquefaction unit (21) is flashed across J-T valve (23) forming a reduced pressure stream (24) that is introduced into flash drum (25) in which it is separated into a flash gas and the liquefied methane (e.g. liquefied biomethane) end-product, the liquefied methane (e.g. liquefied biomethane) end-product being withdrawn from the flash drum as liquefied methane (e.g. liquefied biomethane) end-product stream (26), and the flash gas being withdrawn as flash gas stream (27).

The flash gas stream (27) is introduced as a sweep into the third and final gas separation module (8*c*) in the series of gas separation modules (8*a*, 8*b*, 8*c*) of the second membrane stage (8). More specifically, the flash gas stream (27) is introduced as a third sweep gas stream (27) into the shell space of the third gas separation module (8*c*) exterior to the hollow fibers, flowing in a countercurrent direction to the second intermediate retentate stream (12). Gases from the second intermediate retentate stream that permeate the side walls of the fibers into the shell space form permeate gases that mix with the sweep gas and are withdrawn from the third gas separation module (8*c*) forming the second sweep gas stream (13).

Figure 3:
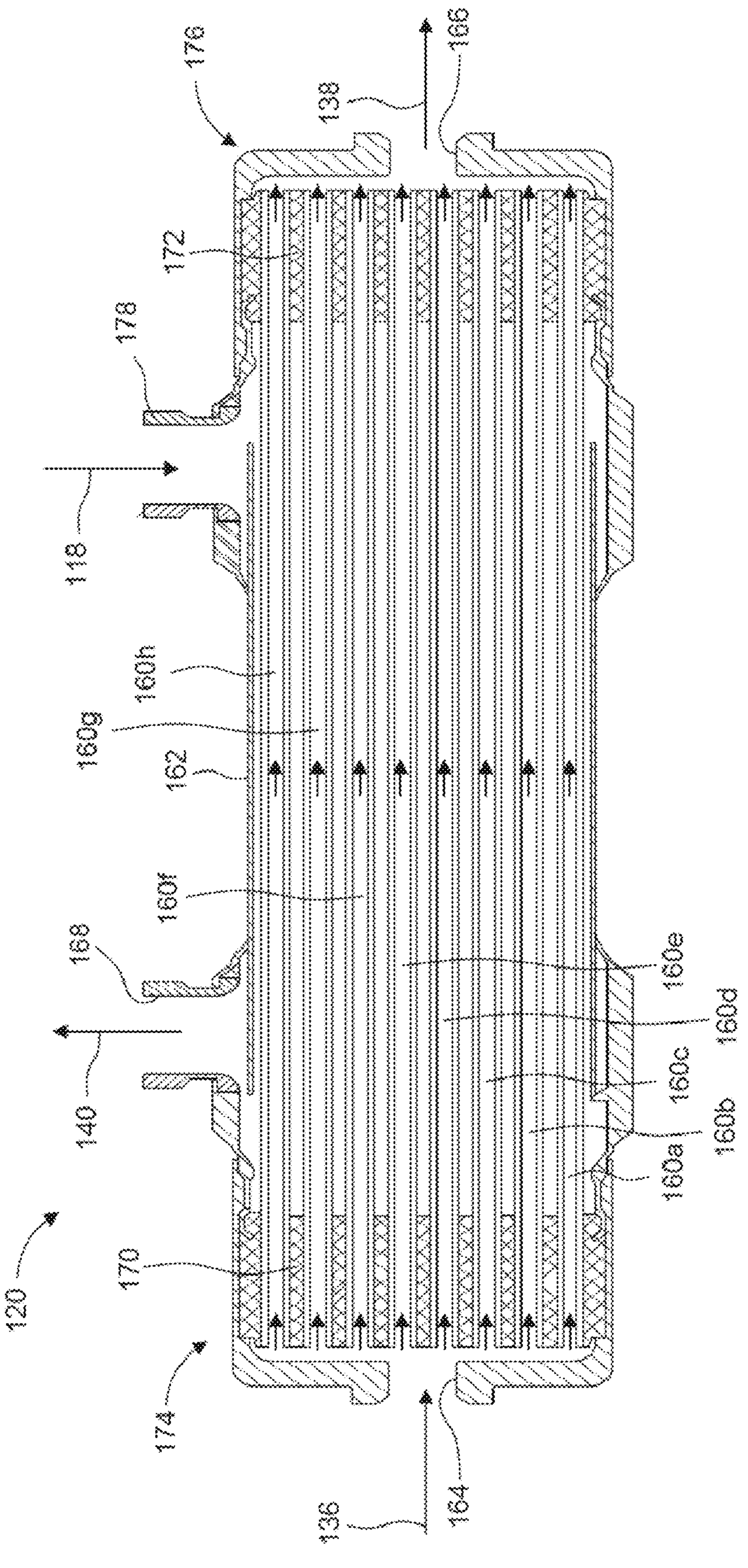
FIG. 3 is a sectional view illustrating the internal structure of a gas separation module of the hollow fiber type suitable for use in the second membrane stage of the methods and systems depicted in FIGS. 1 and 2.

Referring now to FIG. 3, an exemplary gas separation module of the hollow fiber type, suitable for use as any one of the plurality of gas separation modules (8*a*, 8*b*, 8*c*) of the second membrane stage (8) in the methods and systems depicted in FIGS. 1 and 2, is shown. If desired, such gas separation module(s) could likewise be used as the gas separation module(s) of the first and third membrane stages (5) and (16).

The gas separation module (120) comprises a shell (162), a bundle of hollow fibers (160*a*-160*h*) contained within said shell, and a shell space exterior to the hollow fibers and interior to the shell. Each of the hollow fibers (160*a*-160*h*) comprises a bore with open ends and a side wall formed of a membrane material that is more permeable to carbon dioxide than methane.

The gas mixture stream (136) that is to be separated (for example, the first retentate stream (6) in the instance where the gas separation module (120) is the first gas separation module (8*a*) of the series of gas separation module of which the second membrane stage (8) is comprised) is introduced into the shell via a feed inlet (164) and enters the fiber bores via the open ends of the fibers at one end (174) of the fiber bundle.

The gases that pass through the fiber bores and exit the open ends of the fibers at the other end (176) of the fiber bundle form the retentate gases that mix and are then withdrawn from the shell, via a retentate gas outlet (166), as a retentate stream (138) (for example, the first intermediate retentate stream (9) in the instance where the gas separation module (120) is the first gas separation module (8*a*)).

The gases permeating the side walls of the fibers into the shell space form the permeate gases that flow through the shell space in a countercurrent direction to the gases passing through the fiber bores. The permeate gases are withdrawn from the shell, via a permeate gas outlet (168), as a permeate stream (140) (for example, the second permeate stream (10) in the instance where the gas separation module (120) is the first gas separation module (8*a*)).

In the instances where a sweep gas stream (118) is to be introduced into the gas separation module (120) (for example, the first sweep gas stream (11) in the instance where the gas separation module (120) is the first gas separation module (8*a*)), the sweep gas stream (118) is introduced into the shell via a sweep gas inlet (178) and mixes with the permeate gases in the shell space external to the hollow fibers, such that the permeate stream (140) withdrawn from the gas separation module (120) consists of a mixture of the permeate gases and sweep gas. In those instances where no sweep gas is to be introduced (such as where the gas separation module (120) is the last gas separation module (8*c*) of the series of gas separation modules of which the second membrane stage (8) is comprised in the embodiment depicted in FIG. 1), the sweep gas inlet (178) may be sealed or the gas separation module (120) may be of an alternative configuration where the sweep gas inlet (178) is absent altogether.

The bundle of hollow fibers (160*a*-160*h*) is held together at either end (170, 172) by a tubesheet (170, 172), in which the tube sheets also function to seal the feed inlet (164) and retentate gas outlet (166) from the permeate gas outlet (168), sweep gas inlet (178) and shell space external to the hollow fibers containing the permeate gases, such that the only way that gas can pass from the feed inlet (164) to said shell space external to the hollow fibers is via the permeation through the side walls of the fibers.

The tubesheets may for example be made of thermoplastic or thermoset materials. Examples of suitable tubesheet materials include cured epoxy or polyurethane-based formulations. The walls of the hollow fibers may be made of any suitable material that is more permeable to $CO_2$ (and preferably also $H_2O$ and $H_2S$) than $CH_4$ (glassy polymeric materials often being preferred, as noted above). Examples of polymers used to make the walls of the hollow fibers include, but are not limited to, polystyrene, polysulfone, polyethersulfone, polyvinyl fluoride, polyvinylidene fluoride, polyether ether ketone, polycarbonate, polyphenylene oxide, polyethylene, polypropylene, cellulose acetate, polyimide (such as Matrimid 5218 or P-84), polyamide, polyvinyl alcohol, polyvinyl acetate, polyethylene oxide, polydimethylsiloxane, copolymers, block copolymers, or polymer blends. The shell of the gas separation module may for example be constructed of plastic, metal or other suitable materials.

It is an important feature of the methods and systems depicted in FIGS. 1 and 2 that the retentate gases exiting the fibers of a gas separation module (in the plurality of gas separation modules arranged in series of the second membrane stage) mix before being passed to the fibers of the next gas separation module in the series. It is this, along with the use of the permeate gases withdrawn from each gas separation module as a sweep gas in each preceding gas separation module in the series, that enables the second membrane stage to reduce the levels of carbon dioxide initially present in the first retentate stream (6) down to the very low levels of carbon dioxide that are present in the second retentate stream (14).

More specifically, the membrane modelling used for system sizing, evaluation, and academic studies typically assumes an ideal membrane with uniform fiber properties throughout the membrane module. However, in a real gas separation module (of the hollow fiber type) there is always inherent variability in the hollow fiber properties due to the manufacturing process and inefficiencies in separator design.

It is known in the art that variation in fiber properties causes a reduction in module performance, especially where a high purity retentate stream is required (see, for example, Lemanski, et al, 2000, Journal of Membrane Science).

As Lemanski describes, flow through the fiber bores is driven by the pressure difference between the feed end and the retentate end of the fiber, which is always the same for every fiber because the common feed and retentate ports/headers are at a constant pressure. Therefore, variation in fiber properties such as inner diameter (ID) results in unequal flow through each fiber. While variation in permeation properties is a factor, the major contributor to performance reduction is variability in the inner diameter (ID) of the fiber because flow rate is proportional to the 4th power of ID. Larger fiber IDs have high flow rates which produces low purity gas that dilutes the purity of the withdrawn retentate stream, whereas small fiber IDs have low flowrates which reduces the flow of retentate gases exiting said fibers, and in some cases may result in such fibers not producing any gas or even consuming some of the retentate gases of other fibers through back-permeation. The overall effect of this is a reduction in retentate product flow compared to an ideal membrane, which gets progressively worse at higher retentate purities as the loss of production becomes a larger portion of product flow predicted by the ideal model.

Lemanski reports up to a 40-50% reduction in performance compared to an ideal membrane.

As noted above, in the methods and systems depicted in FIGS. 1 and 2 it is typically the case that the second membrane stage (8) must produce a second retentate stream (14) having a volumetric concentration of carbon dioxide that is reduced by a factor of at least 5000, and often by a factor in the range of 5000-10000, relative to the volumetric concentration of carbon dioxide in the first retentate stream (6). If this were to be attempted by using a single large gas separation module with long fibers providing a large total surface area of the membrane, this would carry a high degree of technical risk resulting from likely variance of fibers IDs. However, by using a plurality of gas separation module arranged in series, with retentate gases exiting each module being mixed before being passed to the next module and with the permeate gases exiting each module being used as a sweep gas in the preceding module, this risk is minimized. In simplified terms, mixing the retentate gases exiting the fibers of one module before passing these gases to the next module can be viewed as "re-supplying" the smaller ID fibers of the next module (that may otherwise may have run out of gas if they were small ID fibers of a longer length) as well as reducing the extent to which the larger ID fibers would otherwise dilute the purity of the final retentate product by supplying these fibers with a higher purity feed gas (than they otherwise would have had were they large ID fibers of longer length).

Example 1

A method of producing a liquefied methane product from a methane- and carbon dioxide-containing feed stream as depicted in FIG. 1 was simulated, using Air Products and Chemicals Inc.'s built in membrane process model in ASPEN Plus V10. A feed stream (1) comprising 60 vol % $CH_4$ and 40 vol % $CO_2$ was purified to produce a second retentate stream (14) comprising 99.998% $CH_4$, which can then be liquefied without risk of generating any frozen $CO_2$ solids during the liquefaction. The composition of the various streams is shown in Table 1 below.

TABLE 1

| Stream | 1 | 2 | 4 | 6 | 7 | 9 | 10 |
|---|---|---|---|---|---|---|---|
| % CH4 | 60 | 57.7 | 57.7 | 74.3 | 12.3 | 98.9 | 59.0 |
| % CO2 | 40 | 42.2 | 42.2 | 25.7 | 87.7 | 1.1 | 41.0 |
| barg | 0 | 0 | 15.8 | 15.8 | 2.8 | 15.8 | 0.3 |
| ° C. | 30 | 20 | 20 | 20 | 20 | 20 | 20 |
| Nm3/hr | 1000 | 2166.4 | 2166.4 | 1558.4 | 578.0 | 997.1 | 994.5 |

| Stream | 11 | 12 | 13 | 18 | 20 | 17 | 14 |
|---|---|---|---|---|---|---|---|
| % CH4 | 97.3 | 99.97 | 99.9 | 37.8 | 55.8 | 1.5 | 99.998 |
| % CO2 | 2.7 | 0.03 | 0.1 | 62.2 | 44.2 | 98.5 | 0.002 |
| barg | 0.6 | 15.8 | 0.8 | 2.3 | 0.2 | 0.3 | 15.8 |
| ° C. | 20 | 20 | 20 | 20 | 20 | 20 | 20 |
| Nm3/hr | 403.1 | 789.0 | 195.1 | 172.0 | 1166.4 | 406.0 | 593.9 |

Example 2

In order to demonstrate the effects of using a plurality of gas separation modules of the hollow fiber type arranged in series in the second membrane stage in the manner described and shown in FIGS. 1 and 2, instead of a single larger gas separation module of the hollow fiber type, a simulation was carried out to compare the performance of two gas separation modules of the hollow fiber type arranged in series with a single larger gas separation module of the hollow fiber type. With two gas separation modules arranged in series, the retentate gases exiting the fibers of the first module were mixed before being passed to the fibers of the second module, and the permeate gases withdrawn from the shell space of the second module were introduced as a sweep gas into the shell space of the first module, in the manner described above with reference to FIGS. 1 to 3. For reference, the performance of these two arrangements was also compared with the performance that would be predicted for a single gas separation module having an ideal membrane (i.e. having fibers with completely uniform fiber properties throughout the module).

Again, the simulations were carried out using Air Products' built in membrane process model in ASPEN Plus V10.

For all simulations, a feed gas comprising 40 vol % $CO_2$ and 60 vol % $CH_4$ at 14 barg feed pressure and 30° C. feed temperature, and a 1 psig permeate pressure was used. In all three cases, the total membrane area is the same.

For the simulation of a gas separation module having an ideal membrane, all fibers had an equal fiber ID.

For the simulation of a single gas separation module, and two gas separation modules arranged in series, using "real" membranes, fiber IDs were approximately* normally (Gaussian) distributed throughout the fiber bundle with the mean equal to the ID of the ideal membrane and standard deviation equal to 10% of the mean.

(*As Aspen does not have the capability to model a distribution of fiber IDs within a single membrane module, an approximation was made by modelling 8 membrane segments of equal area in parallel with different fiber IDs corresponding to the midpoints of each 12.5th percentile (12.5th, 25th, 37.5th, etc.) under the bell curve.)

Figure 4:
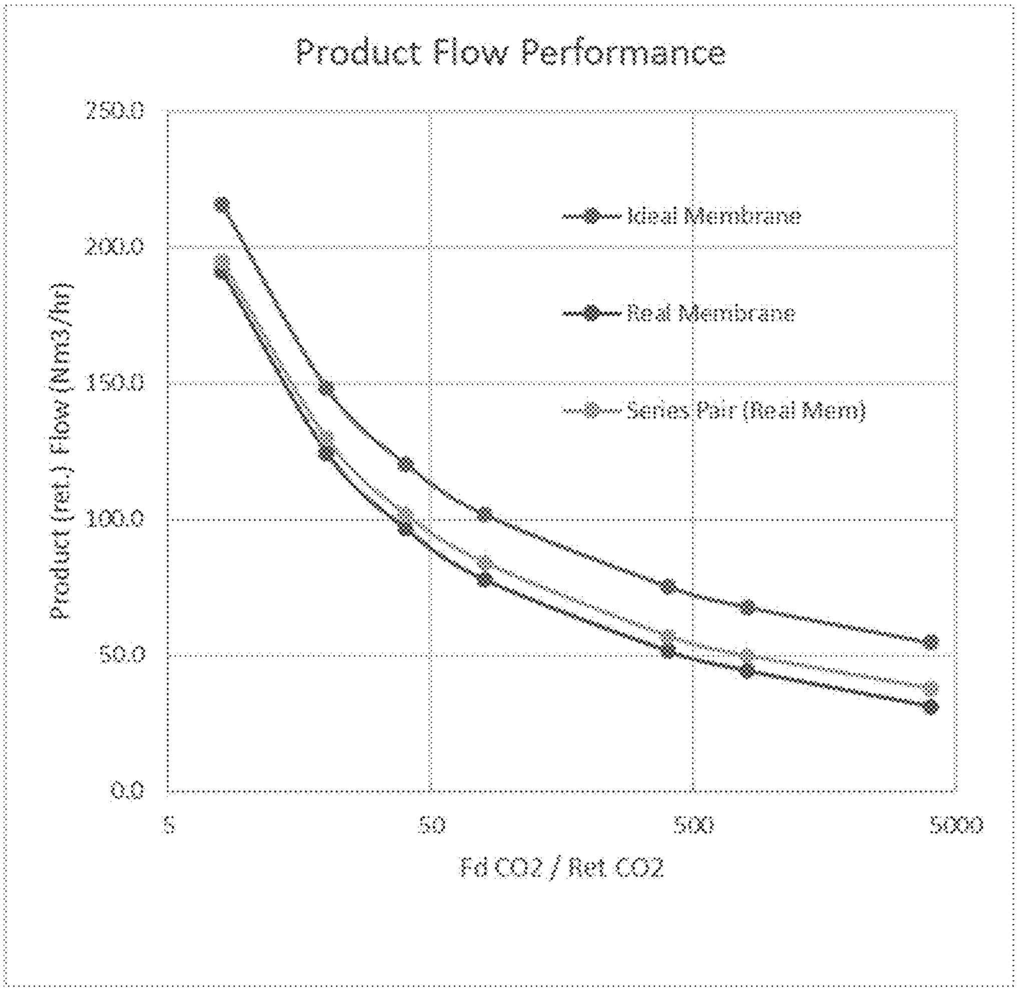
FIG. 4 is a graph plotting retentate flow rate versus $CO_2$ depletion ratio for a single gas separation module of the hollow fiber type with ideal membrane performance, for a single gas separation module of the hollow fiber type with real membrane performance, and for two gas separation modules of the hollow fiber type with real membrane performance arranged in series in the manner taught herein.
Figure 5:
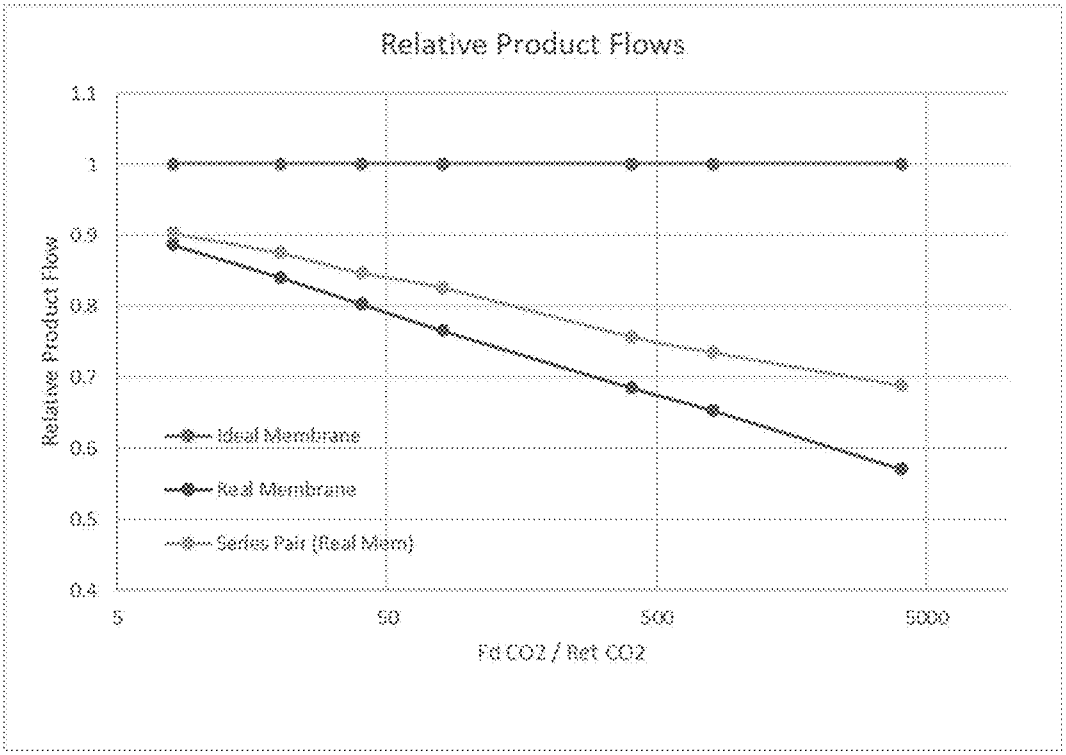
FIG. 5 is a graph plotting relative retentate flow rate versus $CO_2$ depletion ratio for a single gas separation module of the hollow fiber type with ideal membrane performance, for a single gas separation module of the hollow fiber type with real membrane performance, and for two gas separation modules of the hollow fiber type with real membrane performance arranged in series in the manner taught herein.
Figure 6:
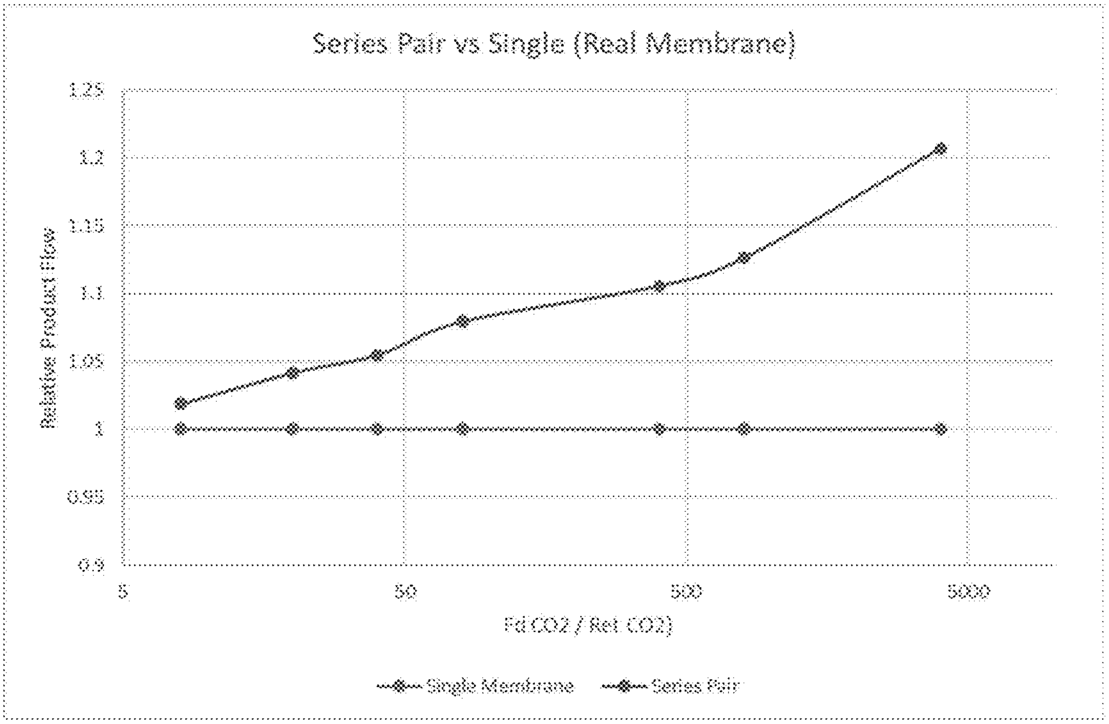
FIG. 6 is a graph plotting relative retentate flow rate versus $CO_2$ depletion ratio for a single gas separation module of the hollow fiber type with real membrane performance, and for two gas separation modules of the hollow fiber type with real membrane performance arranged in series in the manner taught herein.

The results are detailed below in Table 2 and depicted in FIGS. 4 to 6. As can be seen, the two gas separation modules arranged in series (using "real" membranes) provided a marked improvement in performance compared to the single separation module (also using the "real" membrane).

TABLE 2

| Product (retentate) Flow (Nm3/hr) | | | | | | |
|---|---|---|---|---|---|---|
| CO2 Depletion Ratio (Fd CO2/ Ret CO2) | Single Membrane Ideal | Single Membrane Real | % Loss of production Real vs Ideal | Series Pair (with Perm Sweep) Real | % Loss of production series pair vs ideal | % Increase in production (real membranes) series pair vs single |
| 8 | 215.7 | 191.2 | 11.4% | 194.8 | 9.7% | 1.9% |
| 20 | 148.3 | 124.6 | 16.0% | 129.8 | 12.5% | 4.2% |
| 40 | 120.6 | 96.8 | 19.7% | 102.1 | 15.3% | 5.5% |
| 80 | 102 | 78.1 | 23.5% | 84.3 | 17.4% | 8.0% |
| 400 | 75.5 | 51.7 | 31.5% | 57.2 | 24.3% | 10.6% |
| 800 | 67.9 | 44.3 | 34.7% | 49.9 | 26.5% | 12.6% |
| 4000 | 54.8 | 31.2 | 43.0% | 37.7 | 31.2% | 20.7% |

It will be appreciated that the invention is not restricted to the details described above with reference to the preferred embodiments but that numerous modifications and variations can be made without departing from the spirit or scope of the invention as defined in the following claims.

The invention claimed is:

1. A method of producing a liquefied methane product from a methane- and carbon dioxide-containing feed, the method comprising:

(a) introducing a feed stream, comprising methane and carbon dioxide, into a first membrane stage comprising a first gas separation membrane that is more permeable to carbon dioxide than methane;

(b) separating the feed stream in the first membrane stage into a first retentate stream that is enriched in methane and a first permeate stream that is enriched in carbon dioxide;

(c) introducing the first retentate stream into a second membrane stage comprising a second gas separation membrane that is more permeable to carbon dioxide than methane;

(d) separating the first retentate stream in the second membrane stage into a second retentate stream that is further enriched in methane and a second permeate stream; and (e) cooling the second retentate stream to form a liquefied methane product stream from at least a portion of said second retentate stream;

wherein the second membrane stage comprises a plurality of gas separation modules arranged in series, each of said gas separation modules comprising a shell, a bundle of hollow fibers contained within said shell, and a shell space exterior to the hollow fibers and interior to the shell, each of the hollow fibers comprising a bore with open ends and a side wall formed of a membrane material that is more permeable to carbon dioxide than methane, said hollow fibers together constituting all or part of the second gas separation membrane; and wherein said plurality of gas separation modules are configured such that retentate gases and permeate gases flow through the gas separation modules in countercurrent directions, retentate gases exiting from the open ends of the hollow fibers of a gas separation module being mixed before being introduced into the open ends of the hollow fibers of a next gas separation module in the series with the retentate gases exiting the open ends of the hollow fibers of a last gas separation module in the series forming the second retentate stream, and permeate gases exiting the shell space of one of the gas separation modules being introduced as a sweep gas into the shell space of a preceding gas separation module in the series with the permeate gases exiting the shell space of a first gas separation module in the series forming the second permeate stream.

2. The method of claim 1, wherein the plurality of gas separation modules comprise at least three gas separation modules arranged in series.

3. The method of claim 1, wherein the feed stream is a biogas feed stream and the liquefied methane product stream is a liquefied biomethane product stream.

4. The method of claim 1, wherein the second retentate stream comprises 0.005 vol % or less of carbon dioxide.

5. The method of claim 1, wherein the second retentate stream has a volumetric concentration of carbon dioxide that is reduced by a factor of at least 2000 relative to the volumetric concentration of carbon dioxide in the first retentate stream.

6. The method of claim 1, wherein step (e) comprises cooling the second retentate stream to form an at least partially liquefied second retentate stream and flashing and separating said at least partially liquefied second retentate stream to form a flash gas and the liquefied methane product stream.

7. The method of claim 6, wherein the method further comprises using a stream of the flash gas as a sweep gas in the second membrane stage, said stream of flash gas being introduced as a sweep gas into the shell space of the last gas separation module in the series.

8. The method of claim 1, wherein the method further comprises:

(f) recycling the second permeate stream into the feed stream.

9. The method of claim 1, wherein the method further comprises:

(g) introducing the first permeate stream into a third membrane stage comprising a third gas separation membrane that is more permeable to carbon dioxide than methane; and (h) separating the first permeate stream in the third membrane stage into a third permeate stream that is further enriched in carbon dioxide and a third retentate stream.

10. The method of claim 9, wherein the method further comprises:

(i) recycling the third retentate stream into the feed stream.

11. The method of claim 1, wherein the method further comprises compressing the feed stream prior to the introduction of the feed stream into the first membrane stage in step (a).

* * * * *